(12) United States Patent
Fukuoka

(10) Patent No.: US 11,420,508 B2
(45) Date of Patent: Aug. 23, 2022

(54) VEHICLE UNDERFLOOR BATTERY CONNECTOR PROTECTOR STRUCTURE

(71) Applicant: Toyota Jidosha Kabushiki Kaisha, Toyota (JP)

(72) Inventor: Takahiro Fukuoka, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 247 days.

(21) Appl. No.: 16/548,092

(22) Filed: Aug. 22, 2019

(65) Prior Publication Data
US 2020/0062099 A1   Feb. 27, 2020

(30) Foreign Application Priority Data
Aug. 24, 2018   (JP) .............................. JP2018-157711

(51) Int. Cl.
| | |
|---|---|
| *B60R 16/04* | (2006.01) |
| *B60K 1/04* | (2019.01) |
| *B62D 25/20* | (2006.01) |
| *B60L 50/64* | (2019.01) |
| *H01M 50/20* | (2021.01) |

(52) U.S. Cl.
CPC ............... *B60K 1/04* (2013.01); *B60L 50/64* (2019.02); *B62D 25/20* (2013.01); *H01M 50/20* (2021.01); *B60K 2001/0438* (2013.01); *B60Y 2306/01* (2013.01); *H01M 2220/20* (2013.01)

(58) Field of Classification Search
CPC .............. B60K 1/04; B60K 2001/0438; B60K 2001/0405; B62D 25/20; B62D 25/08; B62D 21/11; B62D 21/00; B62D 21/152; B62D 21/155; B62D 21/17; B60L 50/66; B60L 50/64; B60L 50/50; B60L 50/60
See application file for complete search history.

(56) References Cited

U.S. PATENT DOCUMENTS

| | | | |
|---|---|---|---|
| 6,933,440 B2 * | 8/2005 | Ichikawa | H02G 3/0431 174/135 |
| 8,668,253 B2 * | 3/2014 | Bauer | B60R 16/0215 296/199 |
| 8,739,910 B2 * | 6/2014 | Katayama | B62D 21/152 180/68.5 |
| 8,899,360 B2 * | 12/2014 | Mochizuki | B60L 11/18 180/65.1 |
| 9,006,939 B2 * | 4/2015 | Toyama | B60L 50/40 307/147 |
| 9,187,050 B2 * | 11/2015 | Tanigaki | B60L 1/02 |

(Continued)

FOREIGN PATENT DOCUMENTS

| | | |
|---|---|---|
| JP | 2007-203912 A | 8/2007 |
| JP | 2017-109597 A | 6/2017 |
| WO | 2010/137151 A1 | 12/2010 |

*Primary Examiner* — James M Dolak
(74) *Attorney, Agent, or Firm* — Dinsmore & Shohl LLP

(57) ABSTRACT

A vehicle underfloor structure includes a battery having at least one connector projecting from a front end of the battery, and a protector covering and protecting the at least one connector from below, the protector having a rear portion attached to the battery and a front portion fastened to an attachment bar by a fastening bolt. The protector includes a fastening hole through which the fastening bob is inserted, and a cutout connected to a rear portion of the fastening hole and allowing the fastening bolt to separate from the protector.

4 Claims, 7 Drawing Sheets

(56) References Cited

U.S. PATENT DOCUMENTS

| | | | | |
|---|---|---|---|---|
| 9,260,065 | B2* | 2/2016 | Tanigaki | B60R 16/0215 |
| 9,308,830 | B2* | 4/2016 | Nagamori | B60L 3/0069 |
| 9,876,215 | B2* | 1/2018 | Loo | H01M 50/20 |
| 10,023,137 | B2* | 7/2018 | Chinavare | B60K 1/04 |
| 10,232,697 | B2* | 3/2019 | Hara | B60K 1/04 |
| 10,434,861 | B2* | 10/2019 | Narisawa | B60K 1/04 |
| 10,787,070 | B2* | 9/2020 | Kappich | B62D 25/20 |
| 10,953,923 | B2* | 3/2021 | Hoffman | B62D 21/152 |
| 11,001,305 | B2* | 5/2021 | Bremmer | B60R 16/0238 |
| 11,043,723 | B2* | 6/2021 | Mason | H01M 10/425 |
| 11,059,382 | B2* | 7/2021 | Han | H01M 50/20 |
| 11,059,522 | B2* | 7/2021 | Iwasa | B60L 50/72 |
| 11,063,307 | B2* | 7/2021 | Inoue | B60L 50/64 |
| 11,258,104 | B2* | 2/2022 | Chidester | B60L 50/64 |
| 2012/0028135 | A1 | 2/2012 | Ohashi | |

\* cited by examiner

VEHICLE UNDERFLOOR BATTERY CONNECTOR PROTECTOR STRUCTURE

CROSS REFERENCE TO RELATED APPLICATION

This application claims priority to Japanese Patent Application No. 2018-157711 filed on Aug. 24, 2018, which is incorporated herein by reference in its entirety including the specification, claims, drawings, and abstract.

TECHNICAL FIELD

Disclosed herein is a vehicle underfloor structure in which a battery is disposed under a floor of a vehicle.

BACKGROUND

A vehicle having a battery disposed under a floor of the vehicle has been widely known hitherto. For example, JP 2017-109597. A discloses a technique for disposing a battery under a floor of a vehicle. According to JP 2017-109597 A, a connection member (connector) between the battery and refrigerant piping is provided at a front end of the battery. According to JP 2017-109597 A, a protector that is a curved plate is disposed extending downward from a front of the connector and prevents the connector from coming into contact with an object dropped on a road (hereinafter referred to as an "on-road dropped on-road dropped object").

In JP 2017-109597 A, the component to which the proximal end of the protector is connected not specified, but it is presumed that the proximal end of the protector is connected to a body or frame (hereinafter referred to as "body or the like."). Such a body or the like tends to move rearward of a vehicle under a collision load in a front collision where a front of the vehicle collides with any obstacle. In the front collision, the protector connected to the body or the like also moves rearward of the vehicle together with the body or the like. The technique disclosed in JP 2017-109597 A may cause the protector that has moved rearward due to the front collision to collide with the connector or the battery, thereby deteriorating or damaging the connector or the battery.

Therefore, disclosed herein is a vehicle underfloor structure that can properly protect the connector and the battery even in the front collision.

SUMMARY

A vehicle underfloor structure disclosed herein includes a battery disposed under a floor of a vehicle and having at least one connector projecting from a front end of the battery, and a protector covering and protecting the at least one connector from below, the protector having a rear portion attached to the battery and a front portion fastened to a body or a frame by a fastening member. The protector includes a fastening hole through which the fastening member is inserted, and a cutout connected to a rear portion of the fastening hole and allowing the fastening member to separate from the protector.

This configuration causes, in a front collision, the fastening member together with the body or the frame to move rearward of the vehicle to separate from the protector. This disconnects the body or the frame from the protector to prevent the protector from colliding with the battery or the connector, thereby properly protecting the battery and the connector.

In this configuration, the protector may further include a rear slope surface provided adjacent to a vehicle rear side of the fastening hole and inclined to ascend rearward.

This configuration causes the fastening member that moves rearward of the vehicle in the front collision to easily collide with the rear slope surface inclined to ascend rearward. Then, when the fastening member collides with the rear slope surface, the protector easily moves downward, which makes a collision load less prone to being transmitted to the battery through the protector.

The protector may further include a plurality of raised parts and a plurality of recessed parts, the plurality of raised parts being raised in a thickness direction and extending in a vehicle longitudinal direction, the plurality of recessed parts being recessed in the thickness direction and extending in the vehicle longitudinal direction.

This configuration makes the protector less prone to being deformed in the vehicle longitudinal direction. Accordingly, even in the front collision, the protector can easily separate from the body or the frame without being deformed.

In this configuration, the fastening hole and the cutout are provided in each of the raised parts, and a lower end surface of the fastening member is located higher than each of the recessed parts at positions identical to each other in the vehicle longitudinal direction.

This configuration causes both sides in a vehicle width direction of the fastening member to be surrounded by upright walls extending from the raised parts to the recessed parts. As a result, other members are less likely to collide with the fastening member, which in turn effectively prevents deterioration or loosening of the fastening member.

The at least one connector may be located above the recessed parts.

This configuration makes it possible to secure a distance between the connector and the protector and effectively prevent the connector and the protector from coming into contact with each other. As a result, the connector can be protected properly.

The vehicle underfloor structure disclosed herein can properly protect the connector and the battery even in the front collision.

BRIEF DESCRIPTION OF DRAWINGS

Embodiment(s) of the present disclosure will be described by reference to the following figures, wherein.

DESCRIPTION OF EMBODIMENTS

Figure 1:
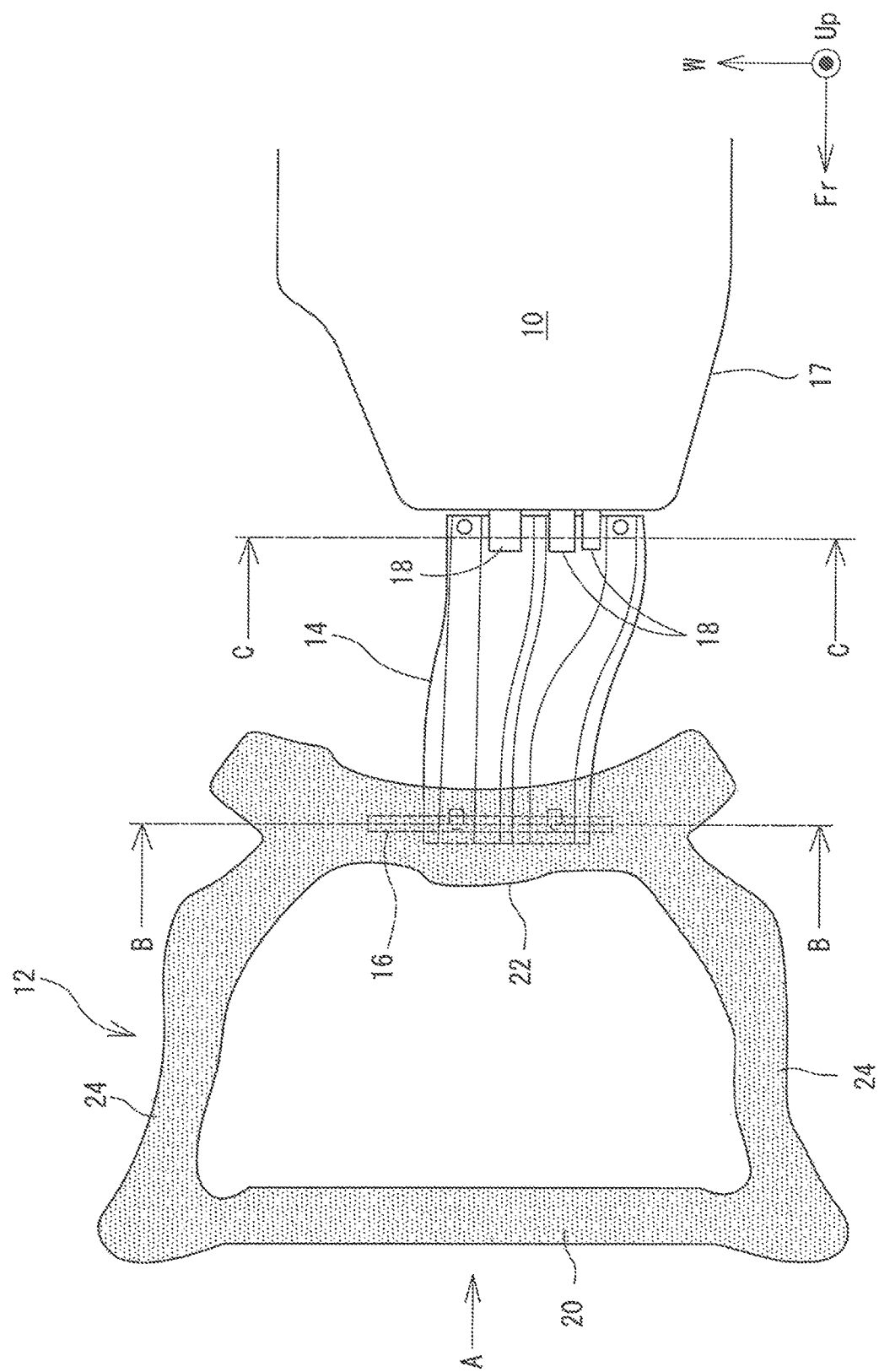
FIG. 1 is a plan view of a section around a battery.
Figure 2:
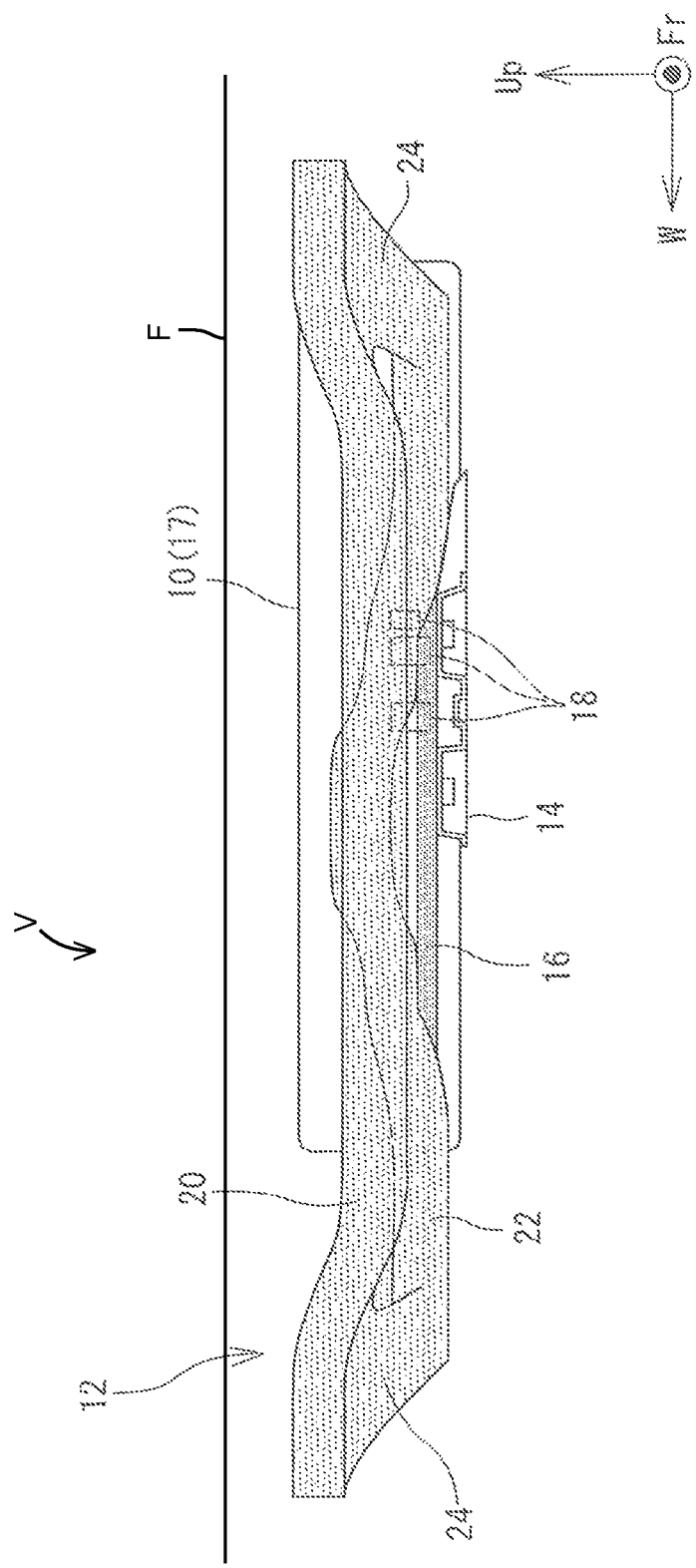
FIG. 2 is a view seen from A of FIG. 1.

Hereinafter, the vehicle underfloor structure will be described with reference to the drawings. FIG. 1 is a plan view of a section around a battery 10. Further, FIG. 2 is a view seen from A of FIG. 1. Note that, in each of the drawings, "Fr," "Up," and "W" denote a vehicle front direction, a vehicle upper direction, and a vehicle width direction, respectively.

The vehicle V is an electric vehicle equipped with at least a motor as a power source, and is, for example, an electric vehicle that travels only by power from the motor, or a hybrid vehicle that travels by power from both the motor and an engine. Under a floor F of the vehicle V, the battery 10 that transfers electric power to and from a traveling motor is disposed. The battery 10 is a chargeable and dischargeable secondary battery such as a lithium ion battery. The battery 10 has a battery case 17 made of metal. Inside the battery case 17, a battery module constituted by a plurality of battery elements (cells) connected in series or in parallel is housed. In this example, the battery case 17 has a substantially rectangular parallelepiped shape that is flat, and elongated in a vehicle longitudinal direction.

A connector 18 that connects the battery module and an external device is attached to a front surface of the battery case 17. For example, a signal line, a power line, and a refrigerant pipe are connected to the connector 18. The number of connectors 18 may be appropriately changed as needed, and may be one, or two or more. In the drawings, an example in which three connectors 18 are provided on the front surface of one battery case 17 is illustrated.

A suspension member 12 is provided adjacent to a vehicle front side of the battery 10. The suspension member 12 is a frame member that supports a suspension. The suspension member 12 of this example includes a front cross part 20 and a rear cross part 22 that extend in the vehicle width direction, and a pair of side parts 24 that each connect an end of the front cross part 20 and an end of the rear cross part 22, and has a substantially square shape.

As is apparent from FIG. 2, the front cross part 20 has an inverted arch shape whose center in the vehicle width direction is concave. Further, the rear cross part 22 has an arch shape whose center in the vehicle width direction is convex. A lower end of the suspension member 12 is located higher than a lower end of the battery 10. Further, lower ends of some of the connectors 18 are located lower than the lower end of the rear cross part 22 at positions identical to each other in the vehicle width direction.

Figure 3:
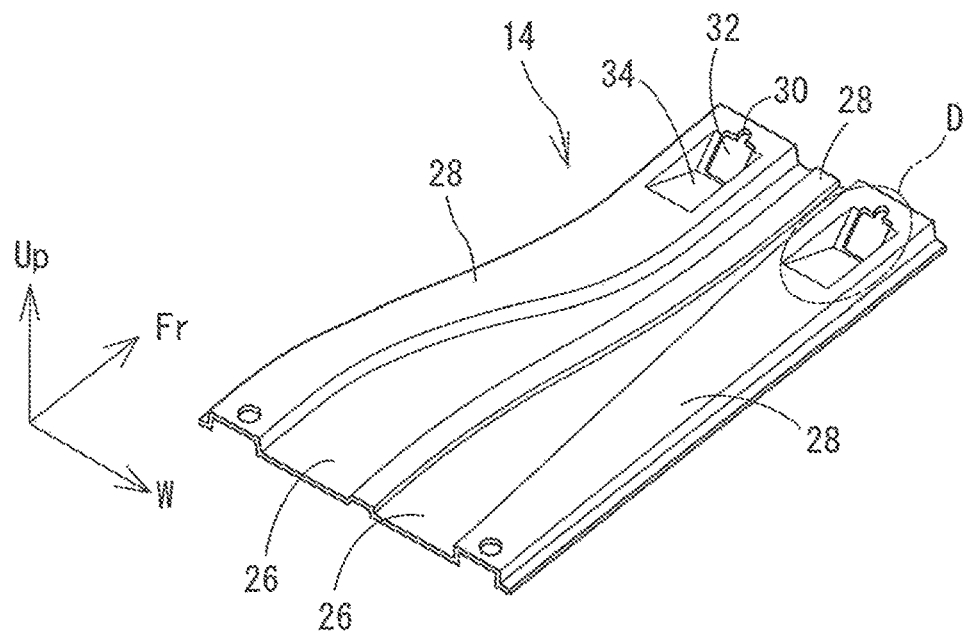
FIG. 3 is a perspective view of a protector.
Figure 4:
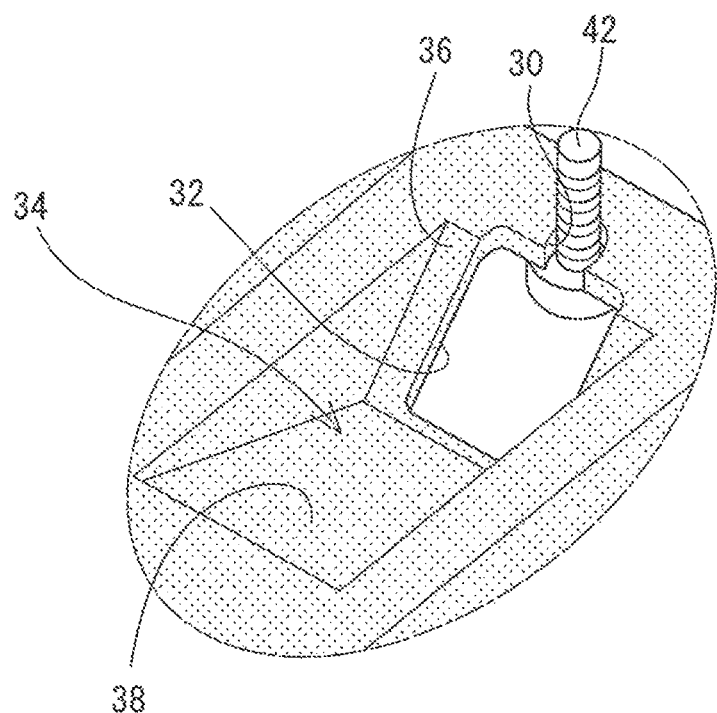
FIG. 4 is an enlarged view of a D section of FIG. 3.

A protector 14 is laid between the suspension member 12 and the battery. FIG. 3 is a perspective view of the protector 14, and FIG. 4 is an enlarged view of a D section of FIG. 3. Note that, in FIG. 4, in order to make a through-hole identifiable, sandy hatching is applied to the protector 14.

The protector 14 covers the connectors 18 from below to protect the connectors 18 from contact with a road surface or a flipped stone. The protector 14 is a plate member long in the vehicle longitudinal direction and is, for example, a press-molded member. The protector 14 has a plurality of raised parts 28 that are raised in a thickness direction and a plurality of recessed parts 26 that are recessed in the thickness direction. The raised parts 28 and the recessed parts 26 each extend in the vehicle longitudinal direction. Further, the raised parts 28 and the recessed parts 26 are alternately arranged. As is apparent from FIG. 3, neither a width of each of the raised parts 28 nor a width of each of the recessed parts 26 is constant, and the width of the raised part 28 is slightly decreased toward a vehicle rear side. Further, the width of the recessed part 26 is significantly increased toward the vehicle rear side.

Figure 5:
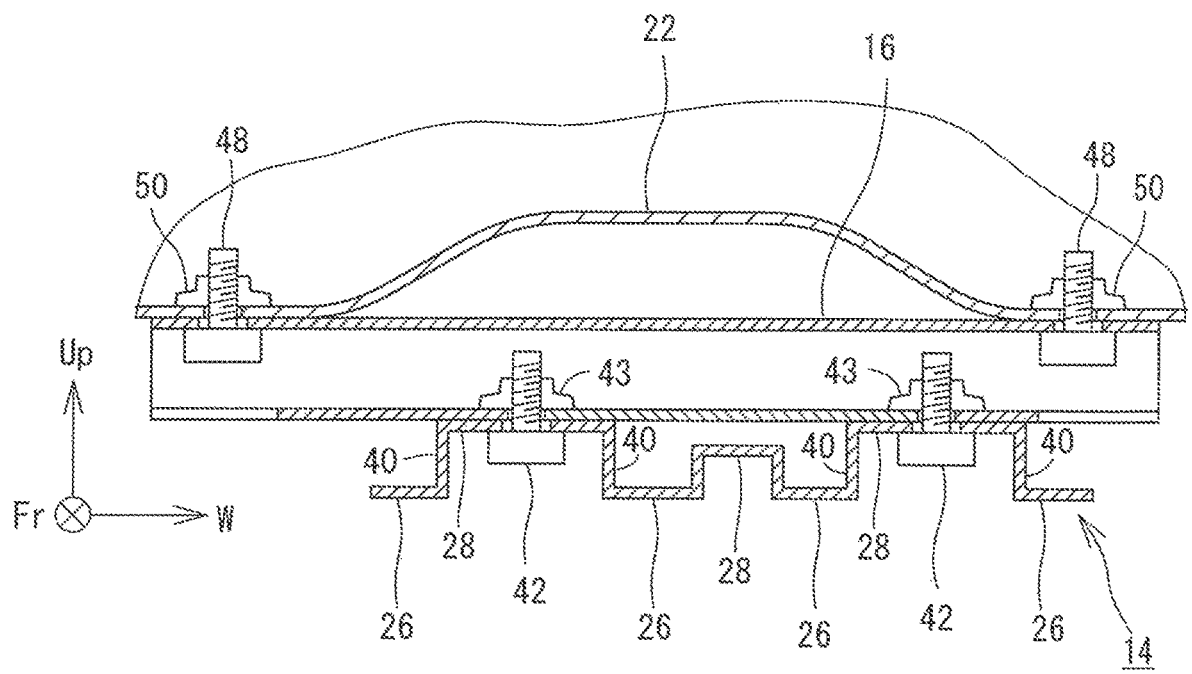
FIG. 5 is a cross-sectional View taken along B-B of FIG. 1.

A front portion of the protector 14 is fastened to the rear cross part 22 of the suspension member 12 using an attachment bar 16 (to be described later). For this fastening, at around a front end of the protector 14, a fastening hole 30 is formed through which a fastening bolt 42 that is a fastening member is inserted. A diameter of the fastening hole 30 is larger than a major diameter of the fastening bolt 42 and smaller than a diameter of a head of the fastening bolt 42. The fastening bolt 42 inserted through the fastening hole 30 is screwed into a weld nut 43 fixed to the attachment bar 16 to fasten the protector 14 to the attachment bar 16. FIG. 5 is a cross-sectional view taken along B-B of FIG. 1, showing how this fastening is carried out.

The protector 14 further includes a cutout 32 that is located adjacent to a rear side of the fastening hole 30 and partially connected to the fastening hole 30 (see FIG. 4). The cutout 32 is sufficiently wider than the diameter of the head of the fastening bolt 42. The cutout 32 thus provided allows the protector 14 and the attachment bar 16; that is, the protector 14 and the suspension member 12, to easily disconnect from each other in a front collision. This will be described later.

Here, as shown in FIG. 4, a portion where the cutout 32 is thrilled is recessed in a substantially V-shape. That is, the protector 14 includes a recess 34 constituted by a front slope surface 36 inclined to descend rearward and a rear slope surface 38 inclined to ascend rearward that are connected to each other in the vehicle longitudinal direction. A portion of the cutout 32 extends across the front slope surface 36. The rear slope surface 38 is a flat surface having neither a cutout nor a hole. It can be said that a rear end (i.e., an upper end) of the rear slope surface 38 is located higher than a lower end of the fastening bolt 42 as described in detail later, and the rear slope surface 38 faces the head of the fastening bolt 42 in the vehicle longitudinal direction.

Further, as is apparent from FIGS. 3 and 5, the fastening hole 30, the cutout 32, and the recess 34 are all formed in each of the raised parts 28. As shown in FIG. 5, a projection amount of the raised parts 28 from the recessed parts 26 is greater than a thickness of the head of the fastening bolt 42. In other words, a lower end of each of the recessed parts 26 is located lower than the lower end of the fastening bolt 42 at a position identical to the fastening bolt 42 in the longitudinal direction. Accordingly, both sides in the vehicle width direction of the fastening bolt 42 are always surrounded by upright walls 40 extending from the raised parts 28 to the recessed parts 26. This makes other members less prone to coming into contact with the fastening bolt 42, which in turn makes it possible to effectively prevent the fastening bolt 42 from being damaged or loosened.

A rear portion of the protector 14 is attached directly to a bottom surface of the battery 10 or indirectly to the bottom surface of the battery 10 with a battery frame (not shown) or the like interposed therebetween. The protector 14 may be attached to the battery 10 by fastening using a bolt or a rivet, or by welding. In any case, attaching the rear portion of the protector 14 to the bottom surface of the battery 10 allows the protector 14 to cover the connectors 18 projecting from the front surface of the battery 10 from below. This makes it possible to protect the connectors 18 front contact with a road surface or a flipped stone.

Figure 6:
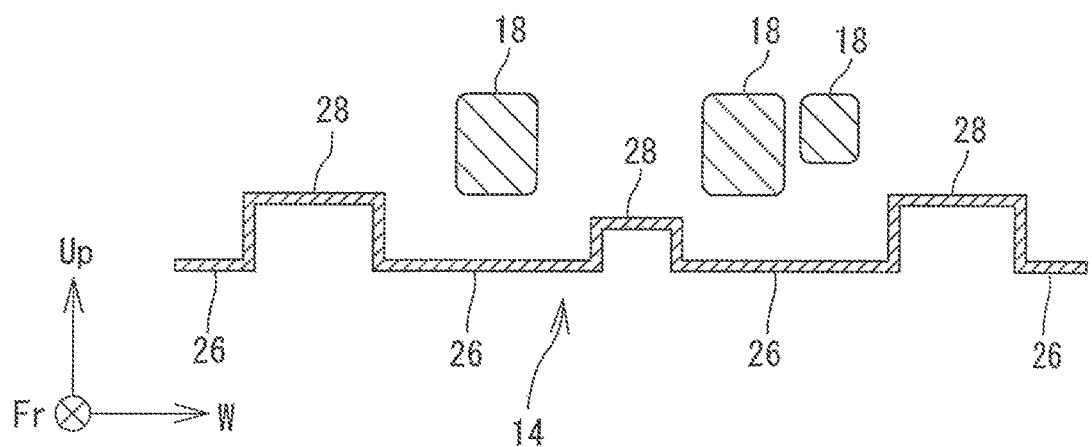
FIG. 6 is a cross-sectional view taken along C-C of FIG. 1.

In the meantime, in this example, such connectors 18 are disposed above the recessed parts 26 of the protector 14. This will be described with reference to FIG. 6. FIG. 6 is a schematic cross-sectional view taken along a line C-C of FIG. 1. As is apparent from FIG. 6, the connectors 18 are all located above the recessed parts 26. This configuration makes it possible to sufficiently secure a distance between each of the connectors 18 and the protector 14 and accordingly prevent the connectors 18 and the protector 14 from coming into contact with each other. Further, such a configuration allows the protector 14 to be disposed higher than a configuration where the connectors 18 are disposed above the raised parts 28. As a result, the contact between the protector 14 and the road surface can also be reduced.

Figure 7:
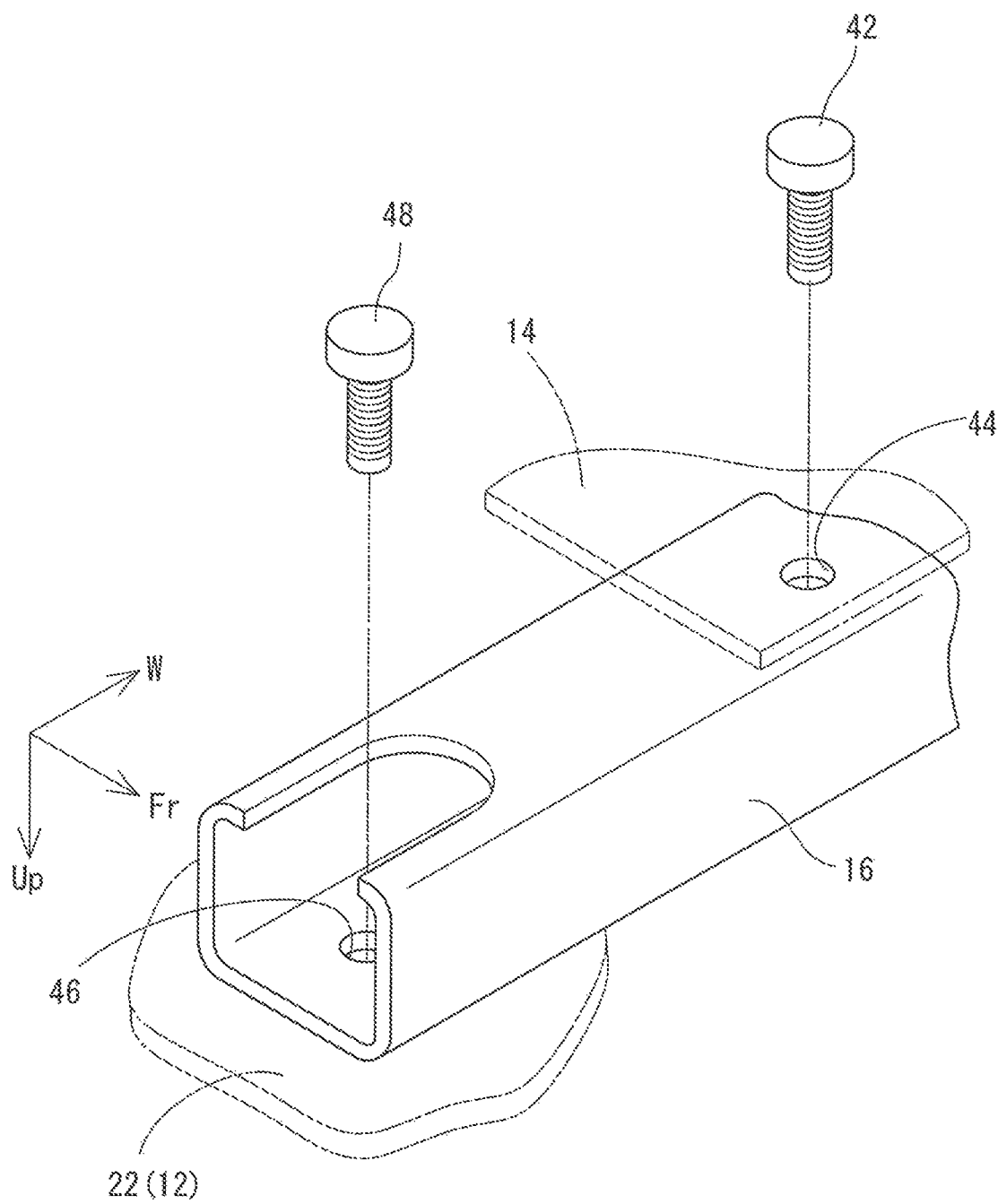
FIG. 7 is a partial perspective view of an attachment bar as seen from below.

As described above, the protector 14 is fastened to the attachment bar 16. The attachment bar 16 is a member attached to a lower portion of the rear cross part 22. FIG. 7 is a partial perspective view of the attachment bar 16 as viewed from below. In this example, the attachment bar 16 is a rectangular tubular member elongated in the vehicle width direction. A through hole 44 used for fastening the attachment bar 16 to the protector 14 is formed through a bottom surface of the attachment bar 16. Further, onto a back surface side of the through hole 44, the weld nut 43 (see FIG. 5) into which the fastening bolt 42 is screwed is fixed.

A through hole 46 used for fastening the attachment bar 16 to the rear cross part 22 is formed at an end and through an upper surface of the attachment bar 16. Further, as shown in FIG. 7, the bottom surface of the attachment bar 16 that faces the through hole 46 is largely cut out, allowing insertion of the fastening bolt 48 from below. At a portion of the rear cross part 22 corresponding to the through hole 46, an insertion hole through which the fastening bolt 48 is inserted is formed, and further, on a back surface side of the insertion hole, a weld nut 50 into which the fastening bolt 48 is screwed is fixed. However, the attachment of the attachment bar 16 to the rear cross part 22 described here is an example, and the attachment bar 16 and the rear cross part 22 may be attached to each other by a different method such as welding.

Here, as described above and shown in FIG. 5, the rear cross part 22 has an arch shape whose center in the vehicle width direction is convex. The attachment bar 16 is attached to a bottom surface of the rear cross part 22 so as to extend across the arch. This produces a certain gap between the upper surface of the attachment bar 16 and the bottom surface of the rear cross part 22 at the center in the vehicle width direction.

As shown in FIG. 2, the attachment bar 16 may have a position and size such that a lower end of the attachment bar 16 is located lower than the lower ends of the connectors 18 and higher than the lower end of the battery 10. This configuration makes it possible to effectively prevent the protector 14 from coming into contact with an object dropped on a road (hereinafter referred to as an "on-road dropped object"). This will be described later.

Figure 8:
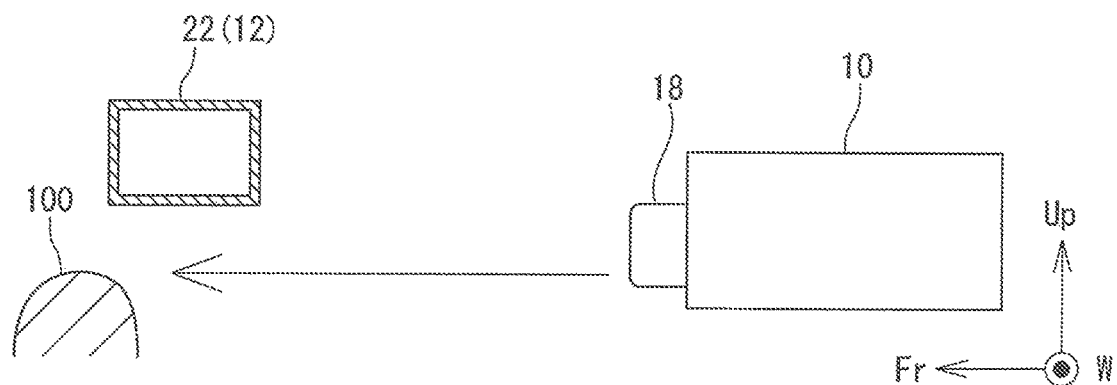
FIG. 8 is a schematic side view of a section around the battery and a rear cross part without the protector or the attachment bar.
Figure 9:
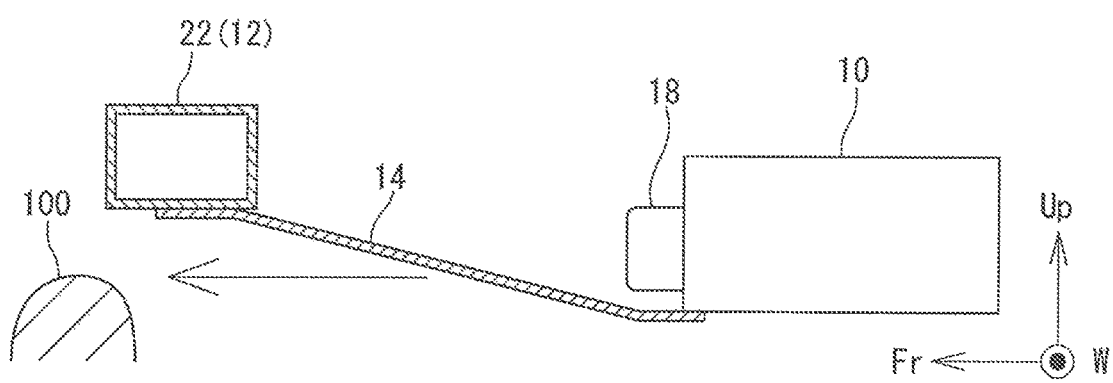
FIG. 9 is a schematic side view of the section around the battery and the rear cross part with the protector but without the attachment bar.
Figure 10:
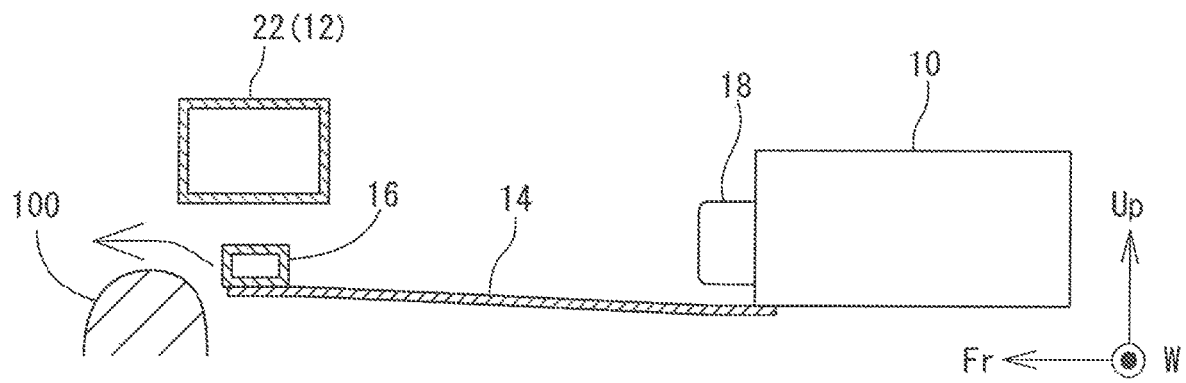
FIG. 10 is a schematic side view of the section around the battery and the rear cross part with the protector and the attachment bar.

Next, the reason why the protector 14 and the attachment bar 16 as described above are provided will be described. FIGS. 8 to 10 are schematic side views of a section around the battery 10 and the rear cross part 22. FIG. 8 shows a configuration where neither the protector 14 nor the attachment bar 16 is provided, FIG. 9 shows a configuration where only the protector 14 is provided but the attachment bar 16 is not provided, and FIG. 10 shows a configuration where both the protector 14 and the attachment bar 16 are provided.

Various objects (on-road dropped objects 100) are dropped on a road, and some of the on-road dropped objects 100 are relatively large. When the lower end of the rear cross part 22 is located higher than the lower ends of the connectors 18, some of such on-road dropped objects 100 may collide with the connectors 18. For example, as shown in FIG. 8, it is assumed that the on-road dropped object 100 is lower than the lower end of the rear cross part 22 but higher than the lower ends of the connectors 18. In this case, the on-road dropped object 100 passes under the rear cross part 22 and collides with the connectors 18 as the vehicle V travels, which may damage or deteriorate the connectors 18.

On the other hand, as shown in FIG. 9, it is assumed that the protector 14 that covers and protects the connectors 18 from below is laid between the rear cross part 22 and the battery 10. In this case, as in FIG. 8, even when the on-road dropped object 100 is present, the on-road dropped object 100 collides with the protector 14 before colliding with the connectors 18. Then, the collision of the on-road dropped object 100 with the protector 14 causes the vehicle V to move upward to run over the on-road dropped object 100, thereby preventing the connectors 18 from colliding with the on-road dropped object 100.

However, since the protector 14 is a thin plate, the protector 14 may be deformed or damaged when colliding with the on-road dropped object 100 with a strong force. In this example, as described above and shown in FIG. 10, the attachment bar 16 is interposed between the protector 14 and the rear cross part 22. The attachment bar 16 extends across the arch formed by the rear cross part 22. In other words, the attachment bar 16 is attached to a position sufficiently lower than the center in the vehicle width direction of the rear cross part 22. Accordingly, many of the on-road dropped objects 100 collide with the attachment bar 16 before colliding with the protector 14 as the vehicle V travels. When the on-road dropped object 100 collides with the attachment bar 16, the vehicle moves upward to run over the on-road dropped object 100. As a result, the contact between the on-road dropped object 100 and the protector 14 is suppressed, which in turn effectively prevents deformation or damage of the protector 14.

In general, the larger an angle between a direction of the force applied to the protector 14 and the surface of the protector 14, the more the protector 14 is prone to being deformed, and the more the direction of the force becomes parallel to the surface of the protector 14, the less the protector 14 is prone to being deformed. When the attachment bar 16 is interposed between the protector 14 and the rear cross part 22, the height of the front end of the protector 14 is lowered, and the inclination of the protector 14 becomes gentle. That is, an attachment posture of the protector 14 becomes almost level. Accordingly, even when the on-road dropped object 100 collides with the protector 14, the angle between the direction (angle) of the force applied at the collision (generally, parallel to the road surface) and the protector 14 is small. As a result, even when the on-road dropped object 100 collides with the protector 14, the protector 14 is less prone to being deformed.

Here, in order for the on-road dropped object 100 to pass under the lower end of the attachment bar 16 to avoid colliding with the protector 14 and the connectors 18, the lower end of the attachment bar 16 may be lowered to some degree. However, when the lower end of the attachment bar 16 is excessively lowered, contact between the attachment bar 16 and the road surface frequently occurs. Therefore, in this example, the attachment bar 16 has a position and size such that the lower end of the attachment bar 16 is located lower than the lower ends of the connectors 18 and higher than the lower end of the battery 10. Such a position and size makes it possible to prevent the on-road dropped object 100 from coming into contact with the protector 14 while suppressing contact between the attachment bar 16 and the road surface.

In the meantime, in the front collision where an obstacle collides with the front of the vehicle V, a large force (collision load) directed rearward of the vehicle V is produced in the suspension member 12. When the battery 10 and the suspension member 12 are connected by the protector 14, the collision load is transmitted to the front portion of the battery 10. The rear portion of the battery 10 is rigidly fixed to a body or frame, so when such a collision load is transmitted to the front portion of the battery 10, a compressive stress in the vehicle longitudinal direct on is undesirably produced in the battery 10.

Figure 11:
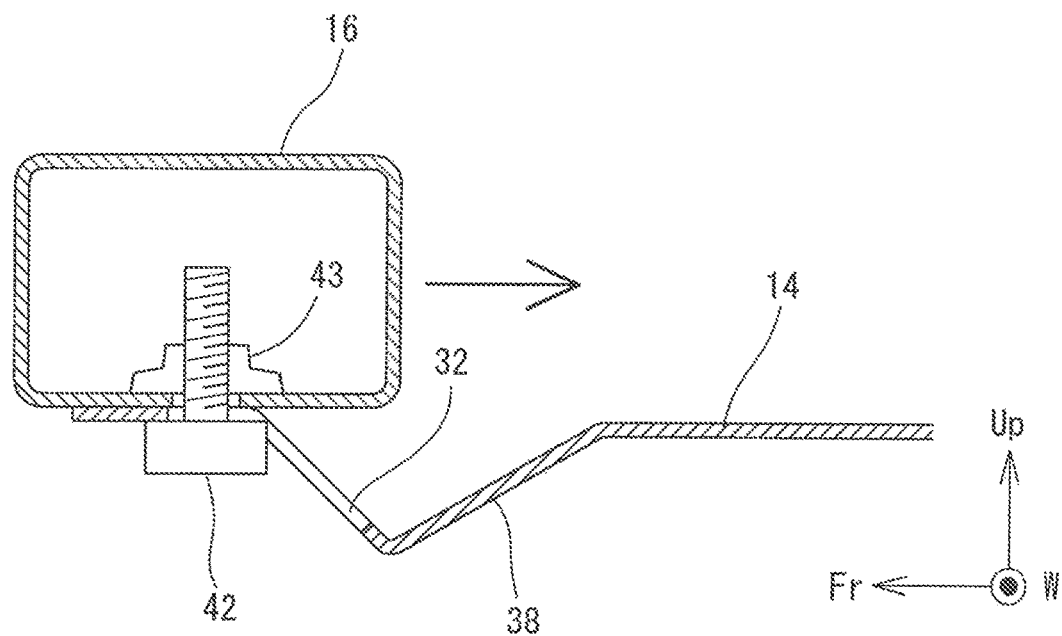
FIG. 11 is a schematic cross-sectional view of a section around a fastening hole in a normal state.
Figure 12:
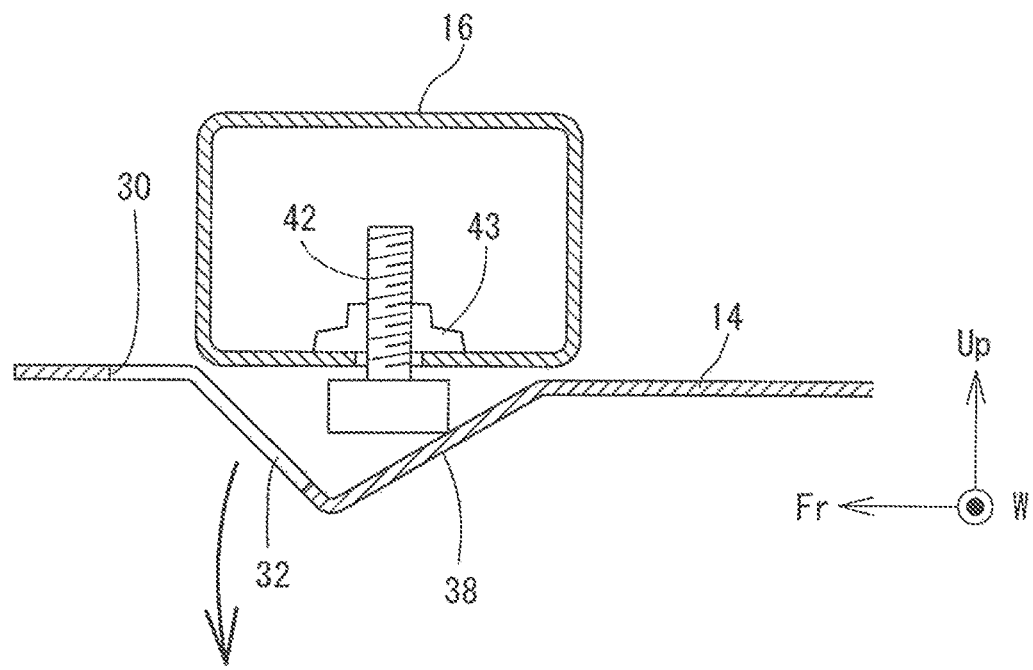
FIG. 12 is a schematic cross-sectional view of the section around the fastening hole in a front collision.

Therefore, in this example, in order for the protector 14 and the suspension member 12 to easily disconnect from each other in the front collision, the cutout 32 is provided adjacent to the rear side of the fastening hole 30 and connected to the fastening hole 30. Further, in this example, as described above, the rear slope surface 38 inclined to ascend rearward is further provided adjacent to the rear side of the fastening hole 30. An effect of the cutout 32 and the rear slope surface 38 will be described with reference to FIGS. 11 and 12. FIGS. 11 and 12 are schematic cross-sectional views of a section around the fastening hole 30, wherein FIG. 11 shows a normal state, and FIG. 12 shows a state in the front collision.

Since the cutout 32 is connected to the rear side of the fastening hole 30, as shown in FIG. 12, the fastening bolt 42 can easily move rearward of the vehicle V. Accordingly, when the suspension member 12 and the attachment bar 16 fixed to the suspension member 12 move rearward in the front collision, the fastening bolt 2 also moves rearward of the vehicle V and passes through the cutout 32. This causes the protector 14 and the attachment bar 16; that is, the protector 14 and the suspension member 12 to disconnect from each other to prevent transmission of the load to the front portion of the battery 10.

Here, in this example the rear slope surface 38 inclined to ascend rearward is provided adjacent to a rear side of the cutout 32. When the fastening bolt 42 passes through the cutout 32 and moves rearward, the head of the fastening bolt 42 collides with the rear slope surface 38. A force produced by this collision is converted to a forward and downward force by the rear slope surface 38 inclined to ascend rearward to cause the protector 14 to easily move downward. Then, when the protector 14 moves downward, load transmission to the battery 10 through the protector 14 is more reliably prevented.

Note that, in order to cause the fastening bolt 42 to collide with the rear slope surface 38, the upper end of the rear slope surface 38 needs to be located higher than the lower end of the fastening bolt 42. Generally, the steeper the inclination angle of the protector 14, the lower the location of the upper end of the rear slope surface 38. In this example, interposing the attachment bar 16 between the protector 14 and the suspension member 12 makes the protector 14 almost level. Thus, a difference in height between the upper end of the rear slope surface 38 and the fastening hole 30 can be suppressed, and the fastening bolt 42 can be made to collide with the rear slope surface 38 more reliably.

Note that the above description is an example, and as long as at least the fastening hole 30 and the cutout 32 are formed in connection with each other in the longitudinal direction at the front portion of the protector 14, the remaining configuration may be changed as appropriate. For example, although in this example the protector 14 is fastened to the suspension member 12 with the attachment bar 16 interposed therebetween, the protector 14 may be fastened directly to the suspension member 12 without the attachment bar 16. That is, a structure as shown in FIG. 9 may be employed. Further, the protector 14 may be fastened to another frame or body rather than to the suspension member 12.

Further, in this example, a bolt is used as the fastening member for fastening the protector 14 to the suspension member 12, but as long as both the protector 14 and the suspension member 12 can be fastened to each other, another fastening member such as a rivet or a clip may be used. Further, the shape of the protector 14 may be changed as appropriate, and may be, for example, a flat shape without any of the recessed part 26, the raised part 28, and the recess 34, or may be curved as a whole.

The invention claimed is:

1. A vehicle underfloor structure comprising:
    a battery disposed under a floor of a vehicle and having at least one connector projecting from a front end of the battery; and
    a protector covering and protecting the at least one connector from below, the protector having a rear portion attached to the battery and a front portion fastened to a frame by a fastening member, wherein
    the protector includes a fastening hole through which the fastening member is inserted, and a cutout formed with a rear portion of the fastening hole and allowing the fastening member to separate from the protector, and
    the protector further includes a plurality of raised parts and a plurality of recessed parts, the plurality of raised parts being raised in a thickness direction of the protector and extending in a vehicle longitudinal direction, the plurality of recessed parts being recessed in the thickness direction of the protector and extending in the vehicle longitudinal direction.

2. The vehicle underfloor structure according to claim 1, wherein
    the protector further includes a rear slope surface provided adjacent to a vehicle rear side of the fastening hole and inclined to ascend rearward.

3. The vehicle underfloor structure according to claim 1, wherein
    the fastening hole and the cutout are provided in each of the raised parts, and
    a lower end surface of the fastening member is located higher than each of the recessed parts at positions identical to each other in the vehicle longitudinal direction.

4. The vehicle underfloor structure according to claim 1, wherein
    the at least one connector is located above the recessed parts.

* * * * *